United States Patent
Graylin et al.

(10) Patent No.: US 9,430,768 B2
(45) Date of Patent: Aug. 30, 2016

(54) MOBILE CHECKOUT SYSTEMS AND METHODS

(71) Applicant: Samsung Pay, Inc., Burlington, MA (US)

(72) Inventors: William Wang Graylin, Winchester, MA (US); Man Ho Li, Kowloon (HK); Jimmy Tai Kwan Tang, Quarry Bay (HK)

(73) Assignee: Samsung Pay, Inc., Burlington ( * ) Notice: Subject to any disclaimer, the term of this patent is extended or adjusted under 35 U.S.C. 154(b) by 0 days.

(21) Appl. No.: 14/837,660

(22) Filed: Aug. 27, 2015

(65) Prior Publication Data

US 2015/0363771 A1 Dec. 17, 2015

Related U.S. Application Data

(63) Continuation-in-part of application No. 14/806,219, filed on Jul. 22, 2015, which is a continuation of application No. 14/185,111, filed on Feb. 20, 2014, now Pat. No. 9,123,036, which is a continuation-in-part of application No. 13/781,964, filed on Mar. 1, 2013, now Pat. No. 9,022,285.

(51) Int. Cl.
*G06Q 40/00* (2012.01)
*G06Q 20/38* (2012.01)
*G06Q 20/12* (2012.01)
*G06Q 20/32* (2012.01)
*G06Q 20/36* (2012.01)
*G06Q 20/40* (2012.01)

(52) U.S. Cl.
CPC .......... *G06Q 20/3825* (2013.01); *G06Q 20/12* (2013.01); *G06Q 20/32* (2013.01); *G06Q 20/3226* (2013.01); *G06Q 20/3227* (2013.01); *G06Q 20/367* (2013.01); *G06Q 20/3674* (2013.01); *G06Q 20/385* (2013.01); *G06Q 20/409* (2013.01); *G06Q 2220/00* (2013.01)

(58) Field of Classification Search
CPC ... G06Q 20/12; G06Q 20/32; G06Q 20/3226; G06Q 20/3674; G06Q 20/385; G06Q 20/409; G06Q 2220/00; G06Q 20/202; G06Q 20/3227; G06Q 20/367; G06Q 20/3825
USPC .......................... 235/379, 380, 383, 492, 493
See application file for complete search history.

(56) References Cited

U.S. PATENT DOCUMENTS

| | | |
|---|---|---|
| 6,206,293 B1 | 3/2001 | Gutman et al. |
| 7,114,652 B2 | 10/2006 | Moullette et al. |
| 2009/0277958 A1 | 11/2009 | Lobo |
| 2010/0051689 A1 | 3/2010 | Diamond |
| 2012/0197743 A1 | 8/2012 | Grigg et al. |
| 2012/0203693 A1 | 8/2012 | Morgan et al. |

(Continued)

*Primary Examiner* — Seung Lee
(74) *Attorney, Agent, or Firm* — Seyfarth Shaw LLP; Brian Michaelis

(57) ABSTRACT

A mobile checkout system and method for completing a purchase transaction to purchase items from an internet merchant. A user browses and selects items for purchase from the merchant through a shopping application or browser. During the processing of the transaction, a checkout application installed on a mobile communication device is launched. The checkout application receives a checkout token created by a checkout server that identifies the purchase transaction. The checkout application uses this token and communicates with the checkout server to cause the checkout server to complete the purchase transaction, in which payment data is securely transmitted using a cryptogram.

18 Claims, 10 Drawing Sheets

(56) References Cited

U.S. PATENT DOCUMENTS

| | | |
|---|---|---|
| 2012/0303520 A1 | 11/2012 | Huang |
| 2013/0024372 A1 | 1/2013 | Spodak et al. |
| 2013/0173477 A1* | 7/2013 | Cairns ............... G06Q 20/3226 705/76 |
| 2013/0256397 A1 | 10/2013 | Brown et al. |

* cited by examiner

MOBILE CHECKOUT SYSTEMS AND METHODS

CROSS REFERENCES TO RELATED APPLICATIONS

This application is a continuation-in-part of U.S. patent application Ser. No. 14/806,219 filed Jul. 22, 2015, which is a continuation application of Ser. No. 14/185,111 filed on Feb. 20, 2014, which is a continuation-in-part of and claims the benefit of U.S. patent application Ser. No. 13/781,964 filed on Mar. 1, 2013, now U.S. Pat. No. 9,022,285, the contents of all of which are incorporated herein by reference in their entirety.

FIELD

The present disclosure relates to a system and a method for implementing a mobile wallet application and checkout processes.

BACKGROUND

Transmission of magnetic stripe data has been done primarily by swiping a magnetic stripe card against a magnetic stripe reader (MSR) to enable payment, identification (ID), and access control functions. Mobile wallet applications on smartphones and tablets have had difficulty interacting with existing merchant point of sale (POS) devices or other devices with MSRs. Contactless reader enabled POS terminals (typically using, for example, an ISO 14443 standard) are not ubiquitous to accept contactless or near field communications (NFC) payments. It would be expensive and would take time to replace the millions of merchant POS devices or door locks that only accept magnetic stripe cards, just to interact with NFC phones or other transmission means like barcodes.

In many countries, the number of contactless payment cards issued is still small compared to the number of magnetic stripe cards issued to consumers. NFC chips with contactless communication capabilities have been embedded in some mobile phones, and are used by companies, such as Google and ISIS, as digital wallets for storing secure cardholder information. These NFC chip based digital wallets can be used in contactless payment transactions with a limited number of NFC capable POS devices, but these NFC chip based digital wallets have significant limitations.

Most phones do not have an embedded NFC chip, severely limiting penetration of this mobile wallet solution to the masses. Furthermore, the process for loading a cardholder's payment credential into the NFC chip's memory is complex and expensive. In particular, loading the NFC chip's memory requires a trusted security manager (TSM). Payment card issuers have to sign up for such a TSM service and to pay for such services.

There are various technical complexities to make the loading process work smoothly, especially when some part of the loading process fails in the middle of a chain of transmissions from the issuer to the TSM to the Internet, via mobile operators' networks to the phone, to the chip. Furthermore, not all standards have been worked out, and there are multiple competing parties making it more difficult to become ubiquitous.

In eCommerce, there are generally two common methods for carrying out an online shopping checkout process. In the first method, the customer selects a payment button, chooses a payment method, and completes the payment process within the merchant online shopping website. The merchant server communicates with the server of the payment service provider to execute the payment transaction. This method allows the customer to stay on the same merchant site; however, the development and integration process between the merchant server and payment service provider is complicated and costly. Also, the customer may be reluctant to enter sensitive information on an unfamiliar webpage or website.

In the second method, the customer's browser is temporarily redirected to a checkout webpage hosted by the payment service provider, such as the PayPal™ checkout process. The customer completes the transaction in the webpage hosted by the payment service provider. After the transaction, the browser is redirected back to the original online shopping website. This method is easier to develop and integrate for the merchant. For the customer, recognition of the payment service provider provides a better sense of security and trust. It can also make the process smoother when the customer has gone through similar payment processes previously.

SUMMARY

The present disclosure relates to devices, systems, and methods including a magnetic stripe capture, storage and transmission device for use in conjunction with a mobile wallet application to capture, store and transmit magnetic stripe card data to merchants' conventional point of sale (POS) terminals and other devices with magnetic stripe readers (MSRs) or checkout systems, in physical and virtual environments. The disclosure also relates to mobile checkout systems and methods. The system provides a convenient buying experience for consumers, a secure and informative transaction for merchants, and in some cases additional data to be transmitted to a MSR for the purpose of loyalty, identification (ID), or access control.

In one aspect, a system for securely capturing, storing and transmitting magnetic stripe payment card data includes a mobile communication device and mobile application, and a magnetic stripe transporter (MST), which can be in the form of an external dongle, or its necessary components be part of the consumer mobile communication device. The MST dongle or built in MST includes a microprocessor, magnetic field transmitter which includes a driver and an inductor that can generate varying magnetic fields, a battery, a charging circuit, a magnetic stripe reader (MSR), a memory means or secure element, plus for the embodiment of a dongle, an audio jack interface, and a communication interface (for example, a USB interface, a 30 pin or 9 pin Apple interface, a Bluetooth interface, etc.) working in conjunction with a consumer mobile device and wallet application for capturing magnetic stripe card data, storing the data securely (which may include incorporating a cryptogram in the magnetic stripe card data), and transmitting such data to merchants' point of sale (POS) or checkout systems, in the physical and virtual environments.

Aspects of the disclosure may include one or more features. The mobile communication device may include a mobile application that initializes the MST for use with a specific wallet account and unlocks the MST for transmission and use. The mobile communication device may be used with a payment checkout application on the mobile communication device or the Internet that interacts with the MST to accept payment card data, which may include a dynamic cryptogram to secure the payment data, from the MST and transmit the payment card data to a payment server for processing a transaction either as a merchant POS application or a consumer checkout application. The mobile wallet application may interact with the MST via the audio jack or other communication interface, in various modes of operation including, for example, an Initialize and Reset Mode, a Load Card Delete Card Mode, a Transmit and Use Mode, a Disconnected Transmit Mode, and a POS Card Read Mode.

In one aspect, the MST operated in the Initialize and Reset Mode is configured to allow a user to pair and unpair/reset a specific MST with a mobile wallet account and only allow one device per account. The MST operated in the Load Card Delete Card Mode is configured to allow a user to load magnetic stripe card data by swiping the user's existing plastic magnetic stripe card on the MSR on board the MST and store the card track data in a memory means or secure element. For payment cards, the application loads the primary account number (PAN) data of the card to an online digital wallet via the mobile wallet application. Card information can also be deleted from the memory means and the server using the application. The MST operated in the Transmit and Use Mode is configured to allow a user to select a specific payment card as a top of wallet or default card for use in transmission of the stored track data to the merchant POS system when a button is activated or pressed. In another aspect, if non-payment cards are stored in the MST, one non-payment card can be stored as the default card to transmit without authenticating to the wallet application and selecting such a card. Non-payment cards include hotel keys, door passes, or ID and Loyalty cards that can be loaded to the MST in a separate memory means for transmission later.

The MST operated in the POS Card read Mode is configured to allow a user to swipe a payment card with the MST's MSR and transmit the card data to a POS application on the mobile communication device then to the payment server and processor. The mobile communication device may be a smartphone, a tablet, or a personal computer. The MST further includes a battery and a charging circuit. The microprocessor is configured to provide security and communications with the mobile communication device. The memory means stores payment card data securely. The MST is configured to transmit card track data to a merchant checkout application on the mobile communication device to create a card-present transaction for the merchant. The MST may also be configured to read payment cards and to transmit payment card data to the mobile communication device and associated POS application that in turn then transmits the transaction and card data to the payment servers and processors like a POS.

In another aspect, the disclosure features a method for securely capturing, storing and transmitting magnetic stripe card data. A magnetic stripe transporter (MST) dongle includes a microprocessor, a driver configured to send current and signal to an inductor that creates varying magnetic fields, a battery, a charging circuit, a magnetic stripe card reader, a memory means or secure element, an audio jack interface, and a communication interface (for example, a USB interface, a 30 pin or 9 pin Apple interface, and a Bluetooth interface, etc.) working in conjunction with a consumer mobile communication device and a wallet application or mobile application for capturing magnetic stripe card data, storing the card data securely, and transmitting such data to merchants' point of sale (POS) terminals, checkout systems, or other MSR devices, in a physical and virtual environment.

The systems and methods disclosed herein provide a number of advantages, for example, the magnetic card track data can be captured and stored in the MST's secure memory means directly by the user or from the server without modification of the magnetic stripe data, to be used later with a MSR device. For payment cards, no change to the magnetic stripe data is needed as opposed to contactless or NFC track data that has special fields that must be encoded by the card issuers in order to function properly with a contactless POS. The MST may include a button that allows transmission of the magnetic card data to a POS while the MST is disconnected or detached from the mobile device.

In an aspect, the unique paring of a MST to a specific wallet account can provide better security, and the ability to reset a MST allows un-pairing and reuse of a MST. Further, the system and method according to the disclosure provides the ability to connect to mobile communication devices via different interfaces beyond audio jack and USB. Also, the process of loading encrypted magnetic stripe track data into memory means of the MST may later be decrypted and transmitted to the MSR of the POS, or for the data to be transmitted encrypted to the mobile communication device and then routed to the payment server for decryption and processing for loading a wallet account on the server or processing a POS transaction.

The system and method according to the disclosure provides the ability to use the stored track data or swiped track data for virtual checkout environments for a more secure and lower cost transaction for merchants, and the remote loading of track data from a card issuer to the wallet server provider to the wallet application on the mobile communication device, to the secure element (SE) or memory means of the MST to be used later. Still further, the system and method provides the ability to load loyalty account information along with the payment card data into discretionary fields of the track data to be read by the issuer upon a transaction, which can lead to offers and loyalty programs combined with a payment transaction.

The combined use of all of the above technologies in a seamless user experience for consumers may increase the frequency of use of mobile wallets and allow a host of applications and functionalities, such as, offers and loyalty with consumers that make it more compelling and deliver value to the consumers and the merchants.

In another aspect, the magnetic stripe card data may be transmitted to the mobile communication device's checkout application and used in a mobile checkout system. Mobile checkout systems and methods are disclosed that aid in reducing drop-out rates of shopping carts and increasing conversion rates into sales. However, it should be appreciated that the mobile checkout systems and methods disclosed herein may be implemented with or without the MST.

In general, the mobile checkout systems and methods include a mobile communication device having a merchant application and/or browser application installed on the mobile communication device that allows a user to select items to purchase from a merchant website. A checkout application is also installed on the mobile communication device that communicates with a checkout server hosting one or more web service checkout application program interfaces (APIs). The checkout application may be launched in response to receiving information corresponding to a purchase transaction, such as when a user selects items to purchase and selects checkout. The checkout application communicates with the checkout server to cause the checkout server to complete the purchase transaction, by communicating with a payment processor. When the transaction is complete the merchant application or browser application that was used to browse and select the items for purchase is relaunched.

In other aspects, the checkout application may be launched in response to receiving the information corresponding to the purchase transaction from the checkout server through a push notification, email, or short message service. The checkout application may also be launched in response to receiving the information corresponding to the purchase transaction from a quick response (QR) code read, captured and/or displayed on the mobile communication device.

BRIEF DESCRIPTION OF THE DRAWINGS

Embodiments of devices, systems, and methods are illustrated in the figures of the accompanying drawings which are meant to be exemplary and not limiting, in which like references are intended to refer to like or corresponding parts, and in which.

DETAILED DESCRIPTION

Detailed embodiments of devices, systems, and methods are disclosed herein, however, it is to be understood that the disclosed embodiments are merely exemplary of the devices, systems, and methods, which may be embodied in various forms. Therefore, specific functional details disclosed herein are not to be interpreted as limiting, but merely as a basis for the claims and as a representative basis for teaching one skilled in the art to variously employ the present disclosure.

Generally, the devices, systems, and methods disclosed herein can include, and may be implemented, within a number of different devices and computer systems, including, for example, general-purpose computing systems, server-client computing systems, consumer-merchant computing systems, mainframe computing systems, a cloud computing infrastructure, telephone computing systems, laptop computers, desktop computers, smart phones, cellular phones, personal digital assistants (PDAs), tablet computers, and other mobile devices. The devices and computing systems may have one or more databases and other storage apparatuses, servers, and additional components, for example, processors, modems, terminals and displays, computer-readable media, algorithms, modules and applications, and other computer-related components. The devices and computer systems and/or computing infrastructures are configured, programmed, and adapted to perform the functions and processes of the systems and methods as disclosed herein.

Figure 1:
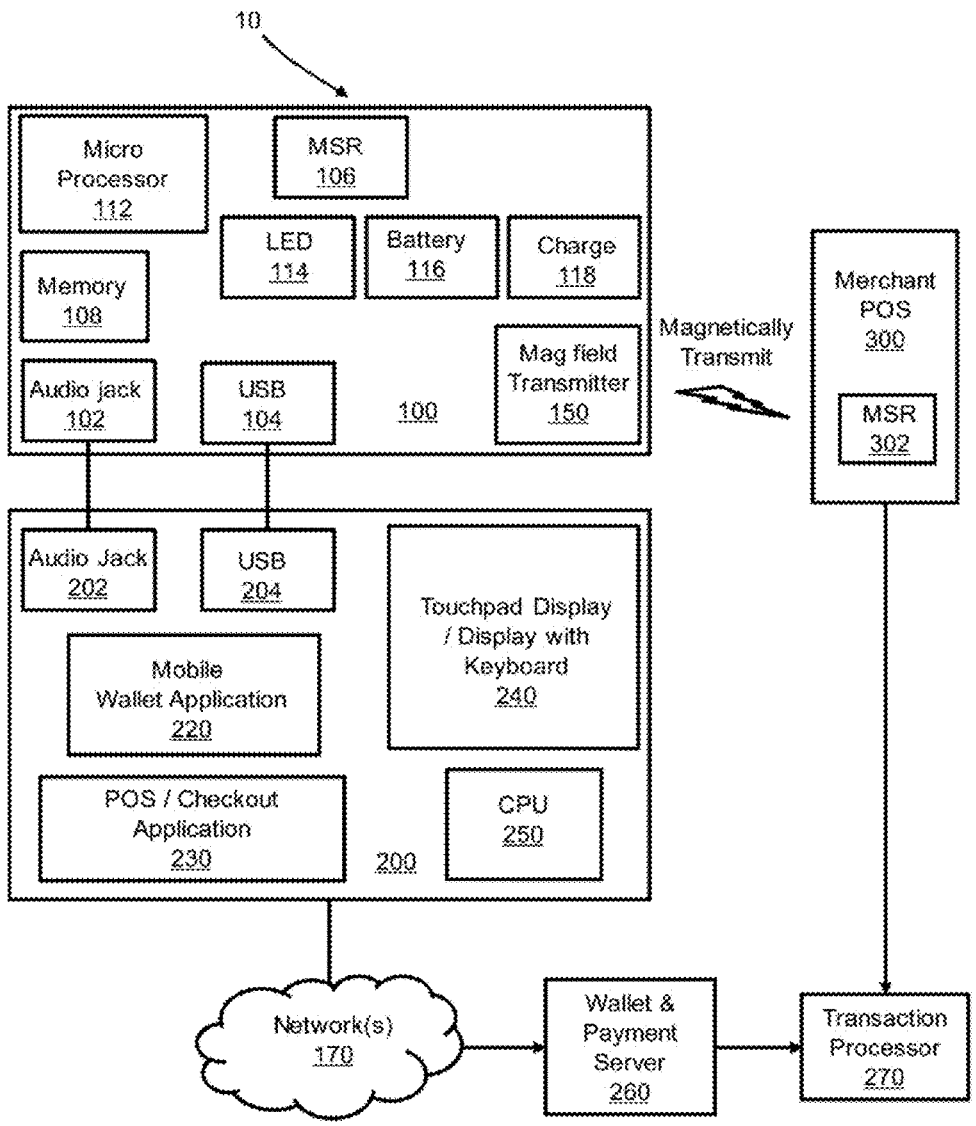
FIG. 1 is a functional block diagram of an overview of a magnetic stripe transporter (MST) and a mobile communication device and merchant point of sale (POS) device.

An overview of a system 10 for capturing, storing and transmitting magnetic stripe card data to a merchant's conventional point of sale (POS) according to an illustrative embodiment is described with reference to FIG. 1. The system 10 includes a magnetic stripe transporter (MST) 100 adapted to interface with a mobile communication device 200. The MST 100 and the mobile communication device 200 may communicate through respective audio jacks 102 and 202, and/or through respective communication interfaces, for example, USB ports 104 and 204, respectively, or through other communication interfaces, including but not limited to, a 30 pin or 9 pin Apple interface, a Bluetooth interface, and other serial interfaces. The MST 100 also interacts with a merchant POS 300 by being adapted to transmit magnetic stripe data from a magnetic field transmitter 150 that includes a driver and an inductor, to a magnetic stripe reader (MSR) 302 of the merchant POS 300.

The mobile communication device 200 includes a mobile wallet application 220 and a POS application or payment checkout application 230. The mobile wallet application 220 initializes and unlocks the MST 100. The POS or checkout application 230 interacts with the MST 100 and accepts card payment data from the MST 100. The card payment data may include a dynamic cryptogram to secure the data. The POS or checkout application 230 may cause the card payment data to be transmitted to a wallet server 260 via a network 170. The card payment data may then be transmitted from the wallet server 260 to a transaction processor 270.

The MST 100 includes a microprocessor 112, a light-emitting diode (LED) indicator 114, a battery 116, a charging circuit 118, a magnetic stripe reader (MSR) 106, a memory storage component or secure element 108, an audio jack interface 102 (for example, a 3.5 mm or other standard audio port), a USB port/jack interface 104 or other communication interface, including but not limited to a 30 pin or 9 pin Apple interface, a Bluetooth interface, and other serial interfaces, and a magnetic field transmitter 150 which includes a driver and an inductor for transmitting magnetic pulses to be received by any POS device with a MSR.

Microprocessor 112 handles security and communications with the mobile communication device 200. The microprocessor 112 can also transmit and receive encrypted card data to and from the secure element 108. The magnetic field transmitter 150 transmits magnetic stripe data of a cardholder to the POS device 300 by transmitting magnetic impulses to the MSR 302. The MST 100 may also be used for reading other magnetic stripe cards by using the MSR 106 as a POS device. The MSR 106 may be used for loading payment card data onto the secure element 108 and for capturing card track data for the POS or checkout application 230 on the mobile communication device 200.

The mobile communication device 200 includes the mobile wallet application 220, the POS or payment checkout application 230, the audio jack port 202 and/or communication interface, for example, the USB port 204 or other communication interface, including but not limited to a 30 pin or 9 pin Apple interface, a Bluetooth interface, and other serial interfaces. The mobile communication device 200 may also include a display with key pad or touchpad display 240 and a central processing unit (CPU) 250.

Each MST 100 is initially open to be paired with a wallet account. Once the MST 100 is paired, the MST 100 may be locked and have to be unlocked to change modes and parameters on the MST 100. The MST 100 can store cardholder data by either an initial load at manufacturing, loading via a wireless communication network after setting up the wallet account, and/or by the consumer loading his/her own card(s)

data directly into the MST 100 using a mobile wallet application. In general, a wallet user is a person that has setup a digital wallet account, for example, on a remote server via a cloud computing infrastructure, and has initialized a mobile wallet application on his/her mobile communication device.

The mobile wallet application 220 on the mobile communication device 200 interacts with the MST 100 in order to provide different modes of operation, for example including: an Initialize and Reset Mode, a Load Card Delete Card Mode, a Transmit and Use Mode, a Disconnected Transmit Mode, a POS Card Read Mode, and optionally other modes.

Figure 2:
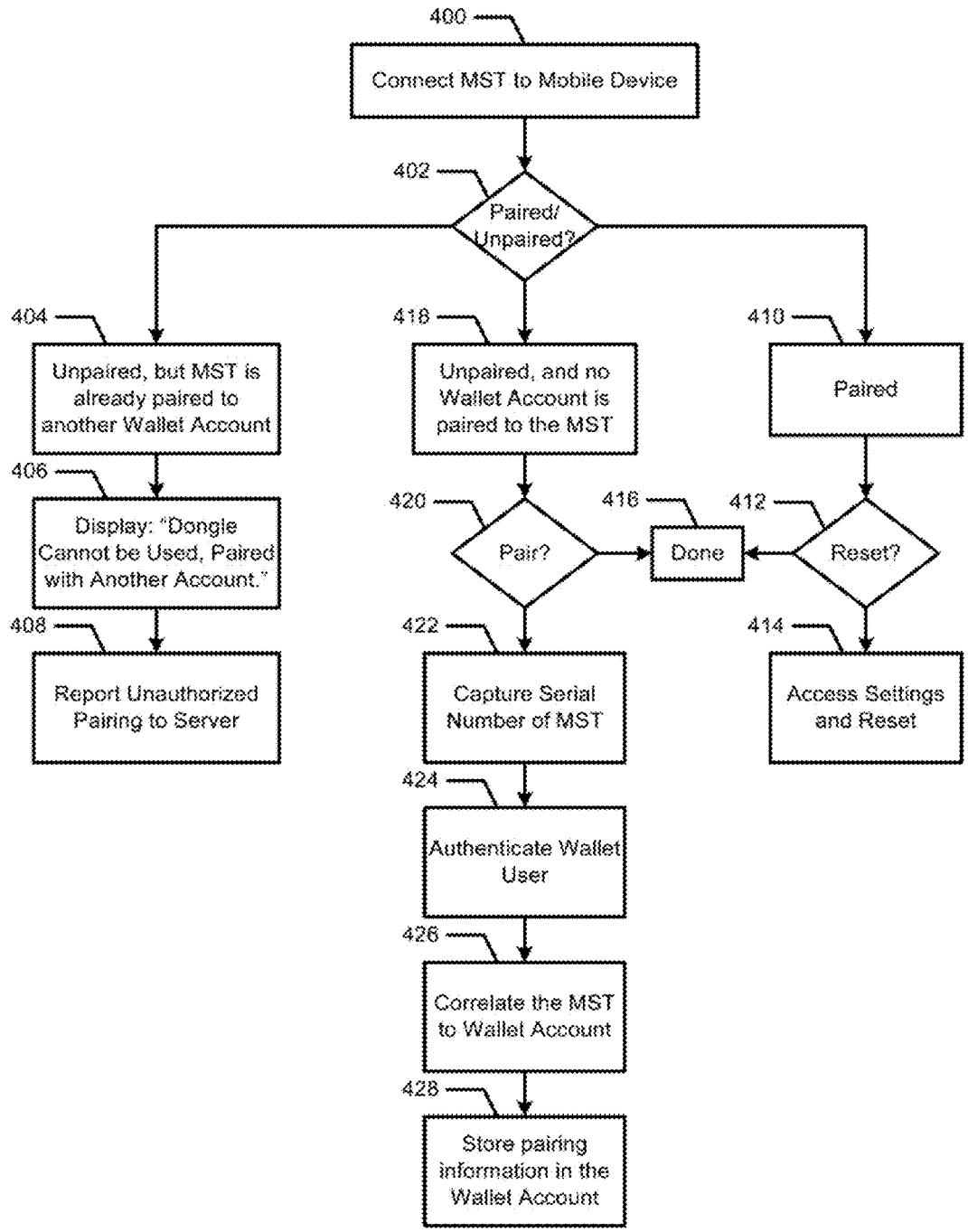
FIG. 2 is a flow diagram of a method of operation in an Initialization and Reset Mode.

A method of operation in the Initialization and Reset Mode according to an illustrative embodiment is described with reference to FIG. 2. An MST is initialized for the first time to a wallet account by plugging in or connecting a "new" MST, or MST that has not been used before or has been "reset" and has no associated wallets and no card data in storage, to the mobile communication device, illustrated as block 400. Upon connecting the MST to the mobile communication device, the wallet application recognizes or determines the status of the MST as paired and unpaired, illustrated as block 402.

When the MST dongle has already been paired to another wallet account, the wallet application will recognize the MST as unpaired but paired to another wallet account, illustrated as block 404, and display "Dongle Cannot be Used, Paired with Another Account," illustrated as block 406. The wallet application may also report unauthorized pairings to the server, illustrated as block 408, for fraud management to prevent wallet users from using the MST inappropriately.

When the MST dongle has been paired to the appropriate wallet account, the wallet application recognizes the MST as paired, illustrated as block 410. The MST can be used or reset, illustrated as block 412. If the appropriate wallet account user desires to reset the MST and wipe clean all data in the SE, the user can access a settings section of the wallet application and select "Reset Dongle", illustrated as block 414. If the appropriate wallet account user desired not to reset the MST, the MST can be used and the process is complete, illustrated as block 416. In one aspect, any user may be allowed to reset the MST dongle from the user's respective authenticated wallet application. Once a unit has been reset, it will need to be Initialized or paired again with a wallet account, even if the same user reset the device, it would be like a clean device with new cards to be loaded.

When the MST dongle has not been paired and there is no wallet account paired to the MST, upon connecting the MST to the mobile communication device, for example, a smartphone with the wallet application thereon, the wallet application recognizes the MST as unpaired, illustrated as block 418. The wallet application may then face a determination as to whether the MST should be paired to the wallet account, illustrated as block 420. If the appropriate wallet account user does not wish to pair the MST, the process is completed, illustrated as block 416.

Alternatively, if the appropriate wallet account user desires to pair the MST, a pairing process begins. The pairing process may include capturing a serial number of the MST, illustrated as block 422, authenticating the wallet user one more time, illustrated as block 424, and correlating the MST to the wallet account, illustrated as block 426. The pairing process may also include storing the pairing information, for example, the serial number of the MST in the wallet account, illustrated as block 428, for future authentication matching each time the MST dongle is used with the wallet application to turn the MST on. In this regard, the MST can only be unlocked and used with the appropriate wallet account in the future.

Figure 3:
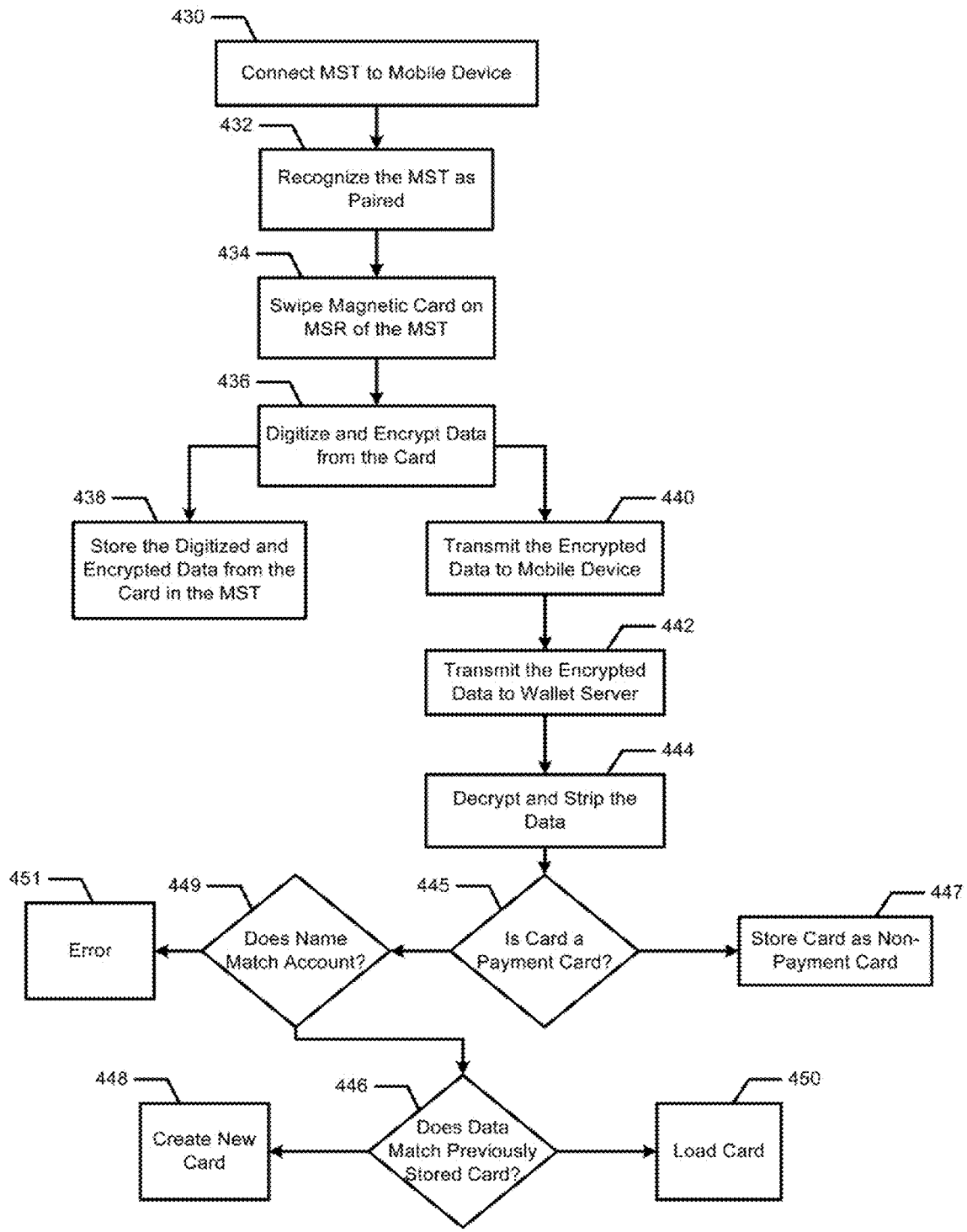
FIG. 3 is a flow diagram of a method of operation in a Load Card Delete Card Mode.

A method of operation in the Load Card Delete Card Mode according to an illustrative embodiment is described with reference to FIG. 3. The MST is connected to the mobile communication device, illustrated as block 430, and the MST is recognized as paired, illustrated as block 432. Once the MST has been "paired" with the wallet account, the wallet user can use the wallet application to load his/her cards by swiping the cards on the built in magnetic stripe reader (MSR) of the MST, illustrated as block 434. The resulting data is digitized and encrypted, illustrated as block 436, and stored into the memory means or SE in the MST for use later, illustrated as block 438. It should be appreciated that the MST data may be otherwise transformed to a secure form. In one embodiment, in addition to or as an alternative to encryption, the MST data may be secured by generating and incorporating a dynamic cryptogram that can be used to secure payment transactions.

The encrypted or secured data may also be transmitted to the mobile communication device, illustrated as block 440. The mobile wallet application may transmit the data to the wallet server, illustrated as block 442. The data may be decrypted at the wallet server and the primary account number (PAN) data, card number, expiration and name of the cardholder is stripped from the track data, illustrated as block 444.

The mobile wallet application or the wallet server may also make a determination as to whether the magnetic card is a payment card or a non-payment card, illustrated as block 445. If the magnetic card is a non-payment card the system can automatically store the track data in the memory for non-payment transmission, and allow the user to name the card and store the non-payment card in the memory means, for example on the MST, illustrated as block 447.

If the magnetic card is a payment card, for example, having a specific format recognizable to the system, the card may be detected as a payment card and the system determines if the name on the payment card matches the name of the wallet account, illustrated as block 449. If the name does not match, an error message may display "Name on card does not match account," illustrated as block 451. If the name on the payment card matches the name of the wallet account, the system may determine if the PAN number matches an existing card already stored on the server, to either create a new account or leave the existing one. If a new card is created, the system may store the track data in a payment section of MST's secure memory encrypted as described below.

A determination may also made as to whether the data matches with any previously stored cards stored in the wallet account, illustrated as block 446. When no match is found, then a new card is created in the wallet user's account on the server, illustrated as block 448. When a new card is created, the system may also store the track data in a payment section of MST's secure memory in an encrypted or otherwise secure form or state (for example, using a cryptogram), such as shown in block 438. When a match is found, the card is identified as existing and the card is loaded, illustrated as block 450.

In an aspect, the MST has the ability to load any type of magnetic stripe card into the memory means, not just payment cards. Non-payment cards may be stored separately with less security for convenience. For example, some non-payment applications may include, cards to open doors, loyalty cards, etc. The loading of payment data vs. non-payment data may be separated into two separate fields or storage areas. In an example, payment cards may not be loaded into non-payment storage. For example, payment data may have a specific format that can be detected and may not be allowed to be loaded into the non-payment storage area. The payment cards may also require authentication with the application before being transmitted. On the other hand, default non-payment data may be transmitted without authentication.

In an aspect, another process of loading the MST is to dynamically and securely send the magnetic stripe data (for example using a cryptogram) from the server through the mobile device and application to the MST. This methodology enables magnetic stripe data to be transmitted from the server to the MST after authentication of the wallet user is performed so that dynamic magnetic stripe data can be transmitted to the mobile device and stored and/or transmitted. In an aspect, track data generated by the server can be dynamically loaded for payment purposes, such that a one-time use payment credential can be generated for the wallet user dynamically at the time of payment.

This one-time use payment credential can be generated for the wallet user dynamically at the time of payment using a dynamic cryptogram. For example, a dynamic cryptogram such as a dynamic-CVV (dCVV) may be generated at the time of payment. This cryptogram may be generated using a key, primary account number (PAN), expiration or expiry date (EXP), timestamp, and/or counter, when the card is used for payment in both Card-Not-Present (CNP) and Card-Present (CP) transactions. The resulting cryptogram generated at the time of payment can be based on a number of methods depending on the level of security required or desired. The cryptogram can be generated locally at the mobile device, or it can be generated from a secure server and delivered to the mobile application for use via the server. The MST is able to transmit different track data payloads with different cryptograms each in the proper magnetic card format recognizable by point of sale terminals. The PAN (whether static or dynamic/token) along with expiry date (which can be used as a token mode indicator to the card issuers' TSP) and the one time use cryptogram (can be used in the CVV2 field) can also be used for remote purchases via existing website or in-app checkout that require the field.

In another aspect, a hotel or casino room key can be transmitted to the user's wallet application or digital wallet and then to the MST so that the user would not have to physically check in and wait in line. The wallet user can "check in" to the hotel via an application on the user's mobile device (optionally, the mobile device location can be matched with the address of the reservation to ensure further security), then reservation server sends to the wallet server a "key" which is then transmitted to the wallet application or digital wallet and loaded on the MST's memory means for non-payment purposes. The user can press a transmit key on the MST, and transmit the magnetic stripe data stored in the MST for non-payment purposes without authenticating to the wallet application. The "key" from the hotel or magnetic stripe data may expire on the server side after a period of time so this method is relatively safe, it can be equated to forgetting to return your magnetic stripe hotel key.

In these aspects, the system has the ability to remotely load an MST from the server, allowing third parties, for example, card issuers to dynamically send payment or non-payment card data to the MST for transmission. A properly paired MST may have to be used in order to load remotely. The system can control if the magnetic stripe data is stored as payment or non-payment card data, thus the system can be used in disconnected mode in different ways. Applications of this method can include sending dynamic payment card tokens from the server for one-time payment use, and remote check-in for hotel rooms without going to the front desk.

When a new "key" or magnetic stripe card data is loaded to the MST and stored in the default non-payment card container of the memory means, then it can be used in a "Disconnected Mode," described in further detail below. When a payment card is selected by the wallet application, the specific card may be enabled for a period of time, for example, 5 minutes, and during this period of time, the non-payment default card would not be able to be transmitted by the MST. To distinguish between payment and non-payment cards, payment cards may have a special format and bank identification number (BIN) that is recognizable, when the application detects a payment card. The BIN may be checked against the name of the account and may be stored for the user if the name matches.

In some aspects, the track data is not stored on the server, only the PAN data is stored. Multiple cards can be loaded into the memory means or SE for selection or use later and can be separated into payment and non-payment cards. In an aspect, payment cards may only be transmitted after authenticating to the wallet application and there may be a time limit after selecting the card to transmit in disconnected mode, while a non-payment card can be selected as a default card transmitted in disconnected mode without authenticating to the wallet application for convenience.

In one aspect, the name on the track data of a card swiped from a physical payment card should match the name of the wallet account in order for storing of a card to be successful for both the MST and the server side, otherwise the application may not complete the load process for that card and display an error message to the user "Error: Name on card does not match account." Once a track data is stored into the SE, the user can view the cards stored in the wallet application, and select a top of wallet card as a default card for transmission for payment and non-payment. There may also be cards stored in a cloud computing architecture via card-not-present methods that are not stored on the MST for card-present payments. However, every card stored to the MST should have an equivalent copy of PAN data only in the cloud computing infrastructure and those cards may have to be separately deleted from the cloud computing infrastructure via the application or Web/Internet. Resetting the MST does not wipe out card data in the cloud computing infrastructure. Duplicated cards that have the same PAN data will not show up as a different card, in order words, if a user already entered a card number in his/her wallet account in the cloud computing infrastructure remotely, and later he/she swipes the same card to load into the MST for physical use, the card in the cloud computing infrastructure would remain and not need to be replicated if the PAN data is the same.

Once cards are loaded on the MST, they can be selected by the wallet application. Selected cards can also be deleted from the MST's memory and from the application.

In yet other aspects, the wallet account may enable the loading of encrypted track data onto the secure memory means or SE of the MST directly from the wallet server such that an issuer can choose to create a card account for a wallet user and then load the SE as a top of wallet card with the track data via the wallet application communicated from the wallet server to the mobile communication device and to the MST. This is a type of remote loading of track data to a wallet user's MST for physical acceptance use. For example, the issuer of a card can be a payment card provider, such as, a credit card provider or bank, or a non-payment card provider, such as, an issuing a hotel card, a door pass, or a loyalty card. The payment card can be a standard payment card or it can be a one-time-use payment card such that the card number is a token that references an actual payment card account on the issuer's server. This can provide more security even if the token becomes compromised or copied, because the number can only be used one time.

Once magnetic card track data is loaded onto the MST, the wallet application may also be configured to capture an image of the front and/or back of the card using a camera of the mobile device, and allow the user to select the cards in his/her MST to be used for transmission. Cards selected in the application can also be deleted using the wallet application, and erased from the memory means. The wallet application can also be used to capture identification cards of the wallet users to show merchants forms of identification with a touch of a button in the wallet application.

Figure 4:
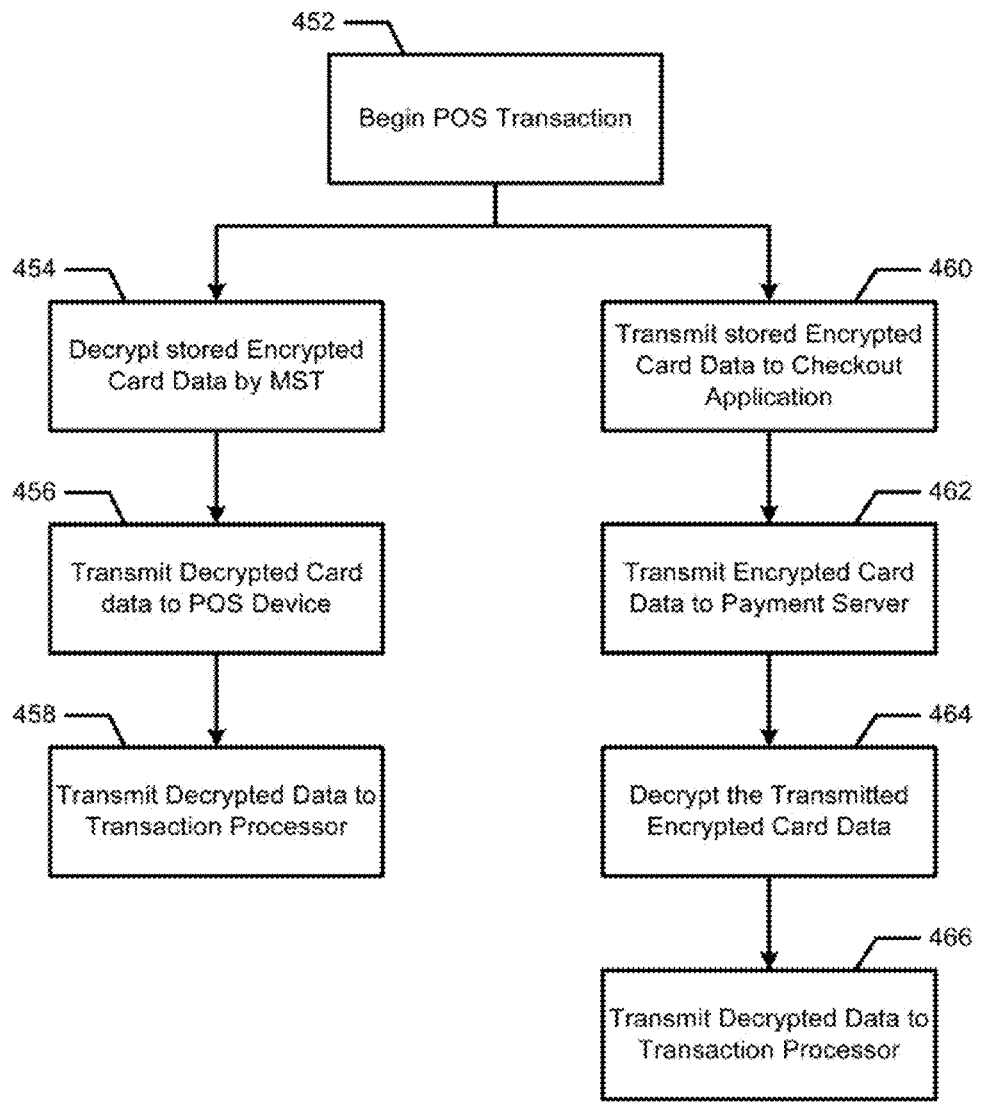
FIG. 4 is a flow diagram of a method of operation in a Transmit and Use Mode.

A method of operation in the Transmit & Use Mode according to an illustrative embodiment is described with reference to FIG. 4. The transaction with a POS begins in block 452. For POS face-to-face transactions, the encrypted track data stored in the memory means or SE can be decrypted by the MST, illustrated as block 454, and then transmitted to the POS, illustrated as block 456. The POS may also transmit the data to the transaction processor, illustrated as block 458.

In other embodiments, the track data stored in the memory means or SE can be securely transmitted by the MST to the POS. For example, the MST may generate a dynamic cryptogram at the time of payment and transmit the dynamic cryptogram to the POS in the proper magnetic card format recognizable by the POS. The resulting cryptogram generated at the time of payment can be based on a number of methods depending on the level of security required or desired. The cryptogram can be generated locally at the mobile device, or it can be generated from a secure server and delivered to the mobile application for use via the server. The MST is able to transmit different track data payloads with different cryptograms each in the proper magnetic card format recognizable by point of sale terminals. The PAN (whether static or dynamic/token) along with expiry date (which can be used as a token mode indicator to the card issuers' TSP) and the one time use cryptogram (can be used in the CVV2 field) can also be used for remote purchases via existing website or in-app checkout that require the field.

For remote transactions, the encrypted track data can be transmitted to the mobile communication device's checkout application, illustrated as block 460. The checkout application may then transmit the data to the payment server, illustrated as block 462. This data can only be decrypted by the corresponding payment server upon checkout, illustrated as block 464, and is not useful otherwise to the mobile application or anyone intercepting such data during transmission over the wireless or wired Internet network or other communication network. The payment server may also transmit the decrypted data to the transaction processor, illustrated as block 466.

Similarly, for remote transactions, the a dynamic cryptogram may be generated using the track data and transmitted to the mobile communication device's checkout application. The checkout application may then transmit the data to the payment server. This data can only be interpreted by the corresponding payment server upon checkout.

Figures 5, 6:
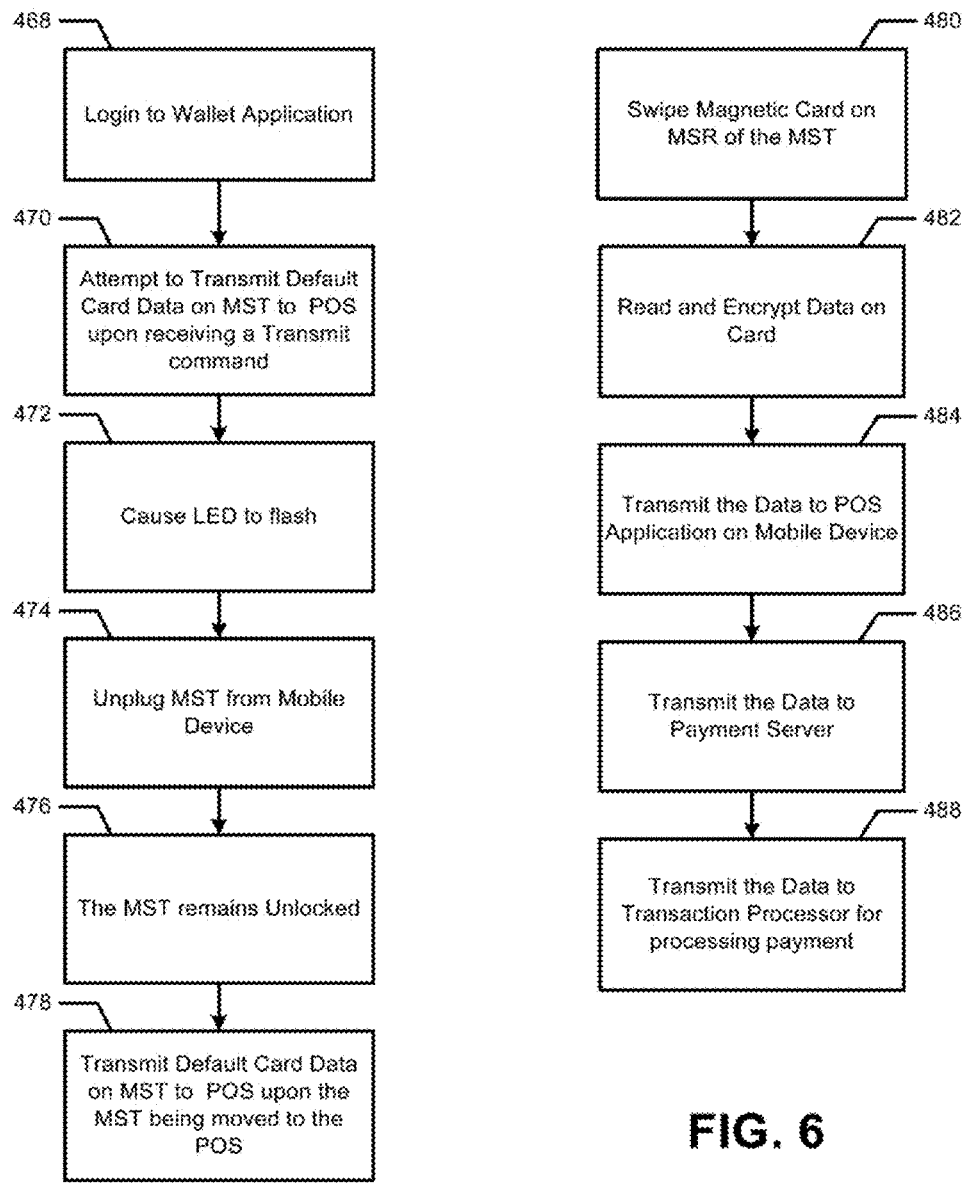
FIG. 5 is a flow diagram of a method of operation in a Disconnected Transmit Mode.
FIG. 6 is a flow diagram of a method of operation in a POS Card Read Mode.

A method of operation in the Disconnected Transmit Mode according to an illustrative embodiment is described with reference to FIG. 5. A wallet user logs into his/her wallet application with the MST connected, for example, via the audio jack or other communication interface, illustrated as block 468. Assuming a card or multiple cards are loaded securely into the SE/secure memory, if more than one card is loaded, the user can change the default/top of wallet card to be used to transmit to a POS when the MST unit is turned on. In one aspect, a specific card may be "Selected" first. The "Selected Card" on the MST can then be transmitted to the POS by pressing the "Transmit" button in the wallet application with the MST dongle plugged in, or by pressing a transmit button on the MST itself, illustrated s block, 470, within a specified period of time before the MST no-longer will allow the transmission of a payment card (which may include transmission of a cryptogram). Upon the transmission attempting to complete, the LED indicator may flash a light, for example a green light, for about 500 ms or other amount of time as desired, illustrated as block 472. For non-payment cards stored in the MST, whenever the payment card is not overriding the default card position, the default non-payment card is available to be transmitted by simply pressing the button on the MST and the LED indicator indicates transmission taking place.

If the MST is authenticated by the wallet application enabled in the default Transmit Mode, and the MST is unplugged from the mobile communication device, illustrated as block 474, then the dongle would stay ON and remain unlocked for up to about 4 minutes or longer, illustrated as block 476. This allows the MST dongle to be transported and used by a merchant or the user to complete the transmission of the card data (which may include a cryptogram) when the MST is in proximity of the POS by pressing the button on the MST during this period, illustrated as block 478, after which the dongle may shut down and have to be turned on and unlocked again by the wallet application. This feature is useful for many restaurants where cards must be taken back to a POS system away from the dining table. This feature allows a waiter to simply take only the MST dongle and move to the POS during the 4 minutes while the unit is on, without needing to take the consumer's mobile communication device along with the MST dongle.

In an aspect, track data can be either stored in the memory means upon manufacturing, loaded by the server remotely, loaded by the consumer by converting his/her magnetic stripe track data into contactless track data if needed via the wallet application using a special procedure, or stored directly as is into the memory means or SE of the MST for use later.

A method of operation in the POS Card Read Mode according to an illustrative embodiment is described with reference to FIG. 6. This mode allows the MST's magnetic stripe reader (MSR) to not only load cards, but also act as a POS by reading and encrypting any magnetic stripe cards used with a POS application on the mobile device to accept payments like any merchant POS application. The user may swipe a magnetic card on the MSR of the MST, illustrated as block 480. The MST reads and encrypts the data on the card, illustrated as block 482. The data may be transmitted to the POS application on the mobile communication device, illustrated as block 484, which can then transmit the data to the payment server, illustrated as block 486. The payment serve may also transmit data to the transaction processor for processing of the payment, illustrated as block 488.

The devices, systems, and methods disclosed herein provide for the magnetic card track data to be captured and stored in the MST's secure memory means directly by the user without modification, and to be used later with a POS or other MSR device unlike contactless or NFC track data that has special fields that must be encoded by the card issuers in order to work with a contactless POS. The MST includes a button that allows transmission of the magnetic card data to a POS while the MST is disconnected or detached from the mobile device, and an LED indicator activates when the MST is properly transmitting. The unique paring of a MST to a specific wallet account such that the MST can be only used with that account for track data storage and transmission use provides better security, and the ability to reset a MST allows unpairing and reuse of a MST. The MST is capable of connecting to mobile communication devices via different interfaces beyond audio jack and USB connections.

The devices, systems, and methods allow for the loading of encrypted magnetic stripe track data into the memory means of the MST that can later be decrypted and transmitted to the POS, or can be transmitted encrypted to the mobile communication device and then routed to the payment server for decryption and processing for loading a wallet account on the server or processing a POS transaction. The devices, systems, and methods provide for the ability to use the stored track data or swiped track data for virtual checkout environments for a more secure and lower cost transaction for merchants.

The devices, systems, and methods provide for the remote loading and transmission of track data from a card issuer to the wallet server provider, to the wallet application on the mobile communication device, and to the SE or memory means of the MST for later use. The devices, systems, and methods also provide for the ability to load loyalty account information along with the payment card data into one or more discretionary fields of the track data to be read by the issuer during or after a transaction, which can lead to offers and loyalty programs combined with a payment transaction.

As described above, magnetic stripe card data, for example stored on secure element 108 of the MST 100 may be transmitted to the mobile communication device's checkout application and used in a mobile checkout system. In an aspect, a mobile checkout system and method is disclosed that aids in reducing drop-out rates of shopping carts and increasing conversion rates into sales. However, it should be appreciated that the mobile checkout systems and methods disclosed herein may be implemented with or without the MST 100.

Figure 7:
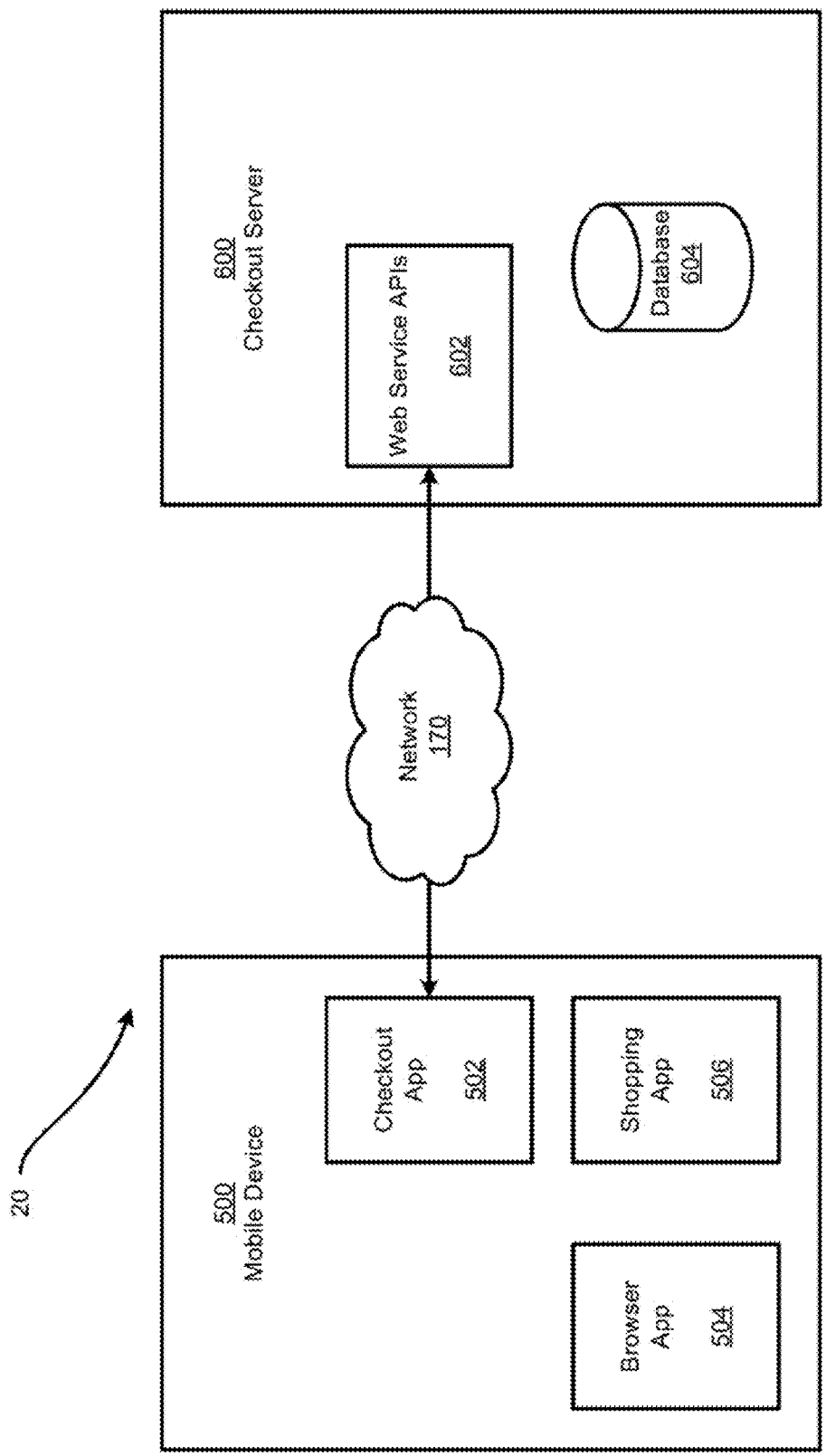
FIG. 7 is a functional block diagram of an overview of a system for performing a mobile checkout process.

An overview of a system 20 for the mobile checkout process according to an illustrative embodiment is described with reference to FIG. 7. The system 20 includes a mobile communication device 500, which may be similar to or the same as the mobile communication device 200 described above, and a checkout server 600. As illustrated, the mobile communication device 500 and the checkout server 600 may communicate with each other over the network(s) 170.

The checkout server 600 hosts one or more web service application program interfaces (APIs) 602 (also referred to as checkout APIs), and a database 604. The database 604 may store user and payment data. The checkout server 600, optionally, may also include a checkout webpage for online checkout in a browser.

The mobile communication device 500 may include a mobile checkout application 502, one or more shopping applications 504, and one or more browser applications 506. The mobile checkout application 502 may be activated or launched from an online shopping webpage or from a mobile shopping application, and is designed to carry out payment transactions. The mobile checkout application 502 stores payment and personal data in hardware and/or peripheral devices of the mobile communication device 500, such as the MST 100 or the wallet application described above; and/or in the remote checkout server 600 or cloud. This data may also be stored using a dynamic cryptogram to secure the payment and/or personal data. The mobile checkout application 502 retrieves or receives customer data and payment card data from the hardware; peripheral devices, such as the MST 100; the wallet application described above; and/or the cloud during the checkout process to reduce the amount of data entry, such as credit card number, expiration date, and billing address during the checkout process. Other applications may also be installed on the mobile communication device 500, such as the shopping application 504 and the browser application 506 that loads shopping websites.

There can be many versions of the checkout application 502 for different mobile platforms including, but not limited to, Android™, iOS™ and Windows™ mobile phones and tablet devices.

The checkout application 502 allows a customer to complete a transaction originated either from a same mobile communication device 500, or from another computing device, such as a desktop or other computing device. The checkout application 502 may also be switched or redirected to or from another mobile application, such as the shopping application 504; switched to or from a webpage on a browser application 506 running on the mobile communication device 500; launched by a push notification sent by the checkout server 600; and/or launched by the user and used to scan a quick response (QR) code representation of the transaction. Each of these modes of operation are described in further detail below.

The checkout application 502 may store the payment and personal data in the mobile phone hardware or peripherals. The checkout application can also store the information in the cloud or remote checkout server 600. The checkout application 502 retrieves the customer data and payment card data, such as a card number, expiration date and billing address, from hardware, peripherals or the cloud during the checkout process to reduce the amount of data entry during the checkout process.

Figure 8:
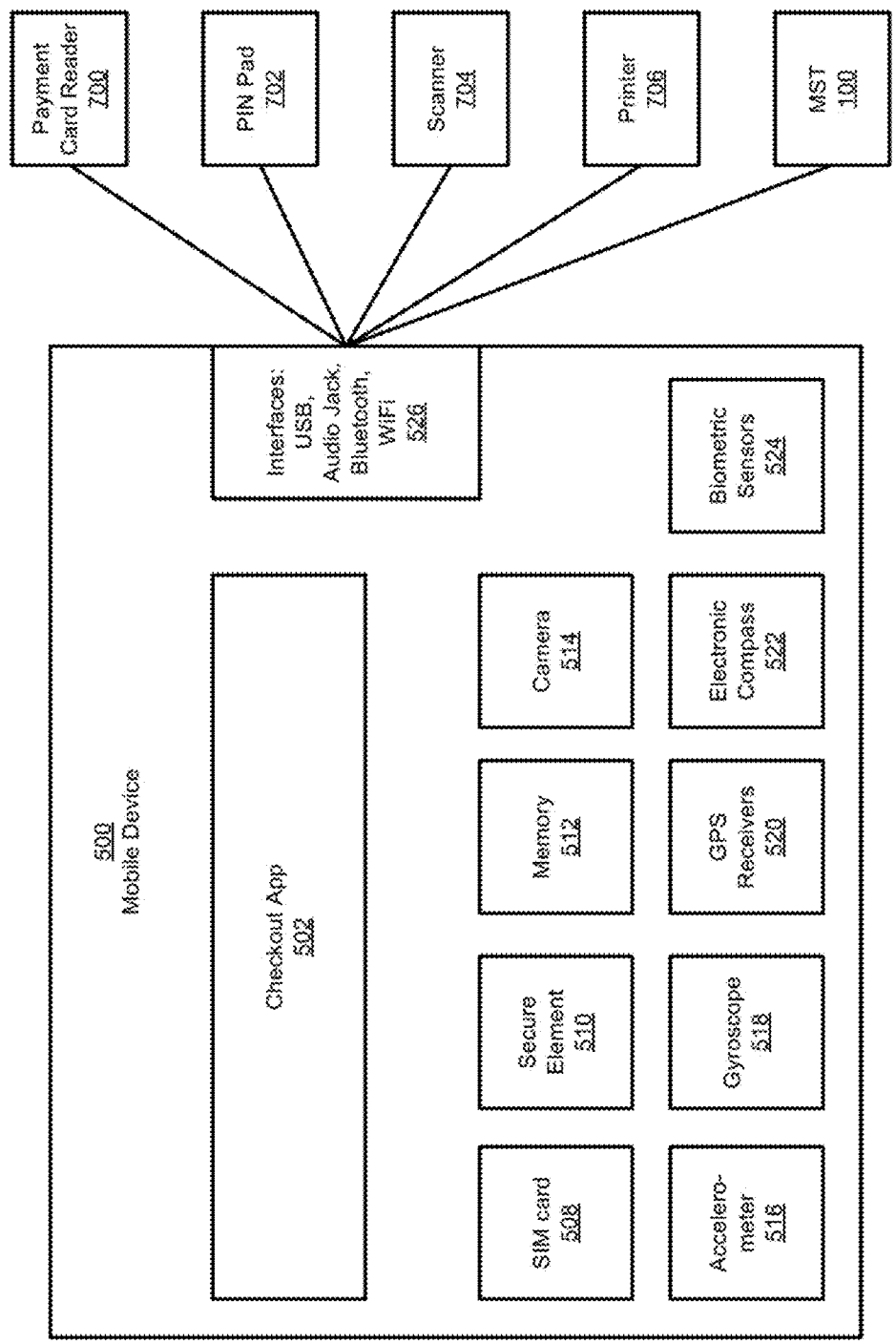
FIG. 8 is a functional block diagram of components of a mobile communication device.

The checkout application 502 running on the mobile communication device 500 may access one or more hardware components of the mobile communication device 500. For example, as illustrated in FIG. 8, the checkout application 502 may access hardware components, including, but not limited to, a SIM card 508, secure element (SE) 510 and memory storage 512, where data can be stored. The checkout application 502 may also access hardware components, including, but not limited to, a camera 514, accelerometer 516, gyroscope 518, GPS receivers 520, electronic compass 522, and biometric sensors 524 where the captured parameters can be used for additional security measures.

The checkout application 502 may access peripheral components and accessories via different communication interfaces 526, including, but not limited to, a USB, Audio Jack, Bluetooth, SerialPort, WiFi and other interfaces. The peripheral components and accessories may include, but are not limited to, payment card readers 700, such as the MST 100, a magnetic stripe card reader, a smart card reader, a NFC card reader, and a EMV card reader; PIN pads 702; bar code scanners 704; printers 706; display units; cheque scanners; etc. for input and output of data.

The checkout application 502 may be launched independently by the user to manage his stored cards and personal information after a successful user authentication. When the checkout application 502 is used with a peripheral device, such as the MST 100, the checkout application 502 may transmit an electromagnetic signal of the track data to emulate a magnetic swipe without the need to physically swipe a card. This allows the checkout application 502 to be used in brick and mortar retail shops for virtual card magnetic stripe transactions.

In an aspect, when the checkout application 502 is directed to or launched from another mobile application or from a webpage in a browser, after the payment transaction, the customer is redirected back to the calling shopping browser webpage or to the calling mobile shopping application indicated by a return uniform resource locator (URL). In this redirection mechanism, the checkout application 502 may register a custom URL scheme with the operating system. After registration, the operating system may use a scheme part, for example, "capp://", in a URL to associate the URL with the checkout application 502.

The operating system may then handle the custom URL scheme/protocol by launching the checkout application 502. For example, in iOS and Android systems, the custom URL may take the form customScheme://mydomain.com/myparameters. In Android, the registration is performed by adding an intent-filter in the AndroidManifest.xml file. In iOS, the registration is performed by adding a "CFBundledURL-Types" setting to the plist.info file. With the above registration performed, the checkout application 502 may then be opened/launched/switched when other applications or websites call this URL. Further, parameters can be passed to the checkout application 502 through the myparameters portion of the custom URL. Through the use of the custom URL scheme redirection mechanism, different shopping applications may redirect to the checkout application 502 to carry out payment operations. Depending on the different scenarios, the transaction results may be sent/redirected back to the calling application or caller through various methods.

When the checkout application 502 is launched by a push notification message or a QR code scan, after the payment transaction, the originating shopping page on the computer or communication device updates the transaction results.

Since the checkout application 502 is a native application on the mobile communication device 500, the checkout application 502 may access hardware or peripheral components that are otherwise inaccessible from a mobile browser. Further, since the checkout application 502 is a centralized application to be launched/switched from or redirected to or from other shopping websites or applications, each merchant no longer has to integrate a hardware driver into their application. Instead, a simple redirect from their application or website in the form of a URL redirection suffices.

To use the checkout system, a user registers and sets up an account by setting a username and password. During the account setup process, personal information of the user, for example, first name, last name, billing address, and shipping address is captured and stored in the checkout server 600. For example, the user account information is stored inside the database 604. An optional identification verification step may be used to verify the validity of the identification of the user. Optionally, information relating to the mobile communication device 500 may also be stored and bound to or associated with the user's account.

The checkout server 600 hosts one or more of the web services and exposes them as application program interfaces (APIs) 602 called Checkout APIs for online/mobile merchants to develop their shopping application(s). As described above, the database 604 is used to store the personal information and the payment information of the registered users. The checkout server 600 also hosts a checkout webpage for a user to complete a transaction inside a browser when the user is performing online shopping.

In one aspect, the shopping application creates a checkout token that is used to uniquely identify a payment transaction by calling an API method hosted by the checkout server 600. Information about the transaction including product information, price and amount, and flow control information such as redirection URLs are provided as input parameters. The URLs can be used to set the redirection or switching back to the calling application or webpage. All the redirection and flow control can be performed with this checkout token, which is used to track the payment transaction. The merchant application or website can inquire the status of the payment transaction by calling an API method hosted by the checkout server 600.

Figure 9:
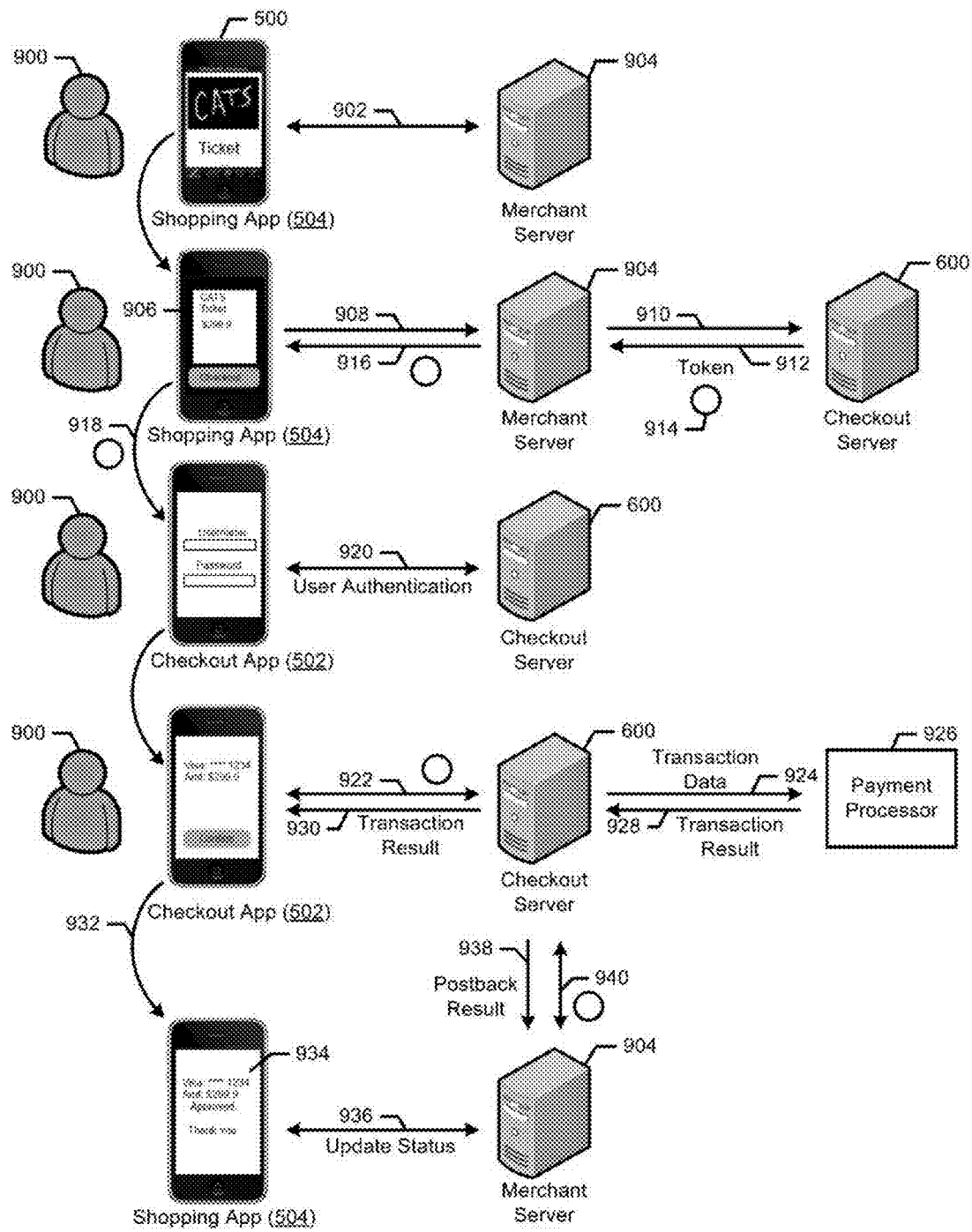
FIG. 9 is a flow diagram of a method of performing a mobile checkout process using an online shopping website and a mobile shopping application.

In an aspect, FIG. 9 illustrates an exemplary operation flow of online ticketing using an online shopping website and a mobile shopping application. In this example, the user or customer 900 is browsing using a shopping application 504 on the user's mobile communication device 500. The customer 900 launches the shopping application 504, such as an opera ticket application. The customer 900 uses the shopping application 504 to browse and add items to a shopping cart for checkout and purchase. In this example, the shopping application 504 manages the shopping cart and communicates 902 with the merchant server 904 to obtain updated information of the products, such as, the opera show title, show time, and price. When the customer 900 decides to buy a product, the customer selects the product and proceeds to a checkout step 906. In the checkout step, the customer 900 selects 908 the checkout button to purchase the product. The application 504 calls 910 the checkout server 600, via the merchant server 904, and passes the information about the product, transaction amount, etc. The merchant server receives 912 a checkout token 914 from the checkout server 600.

The application 504 receives 916 the checkout token 914 and redirects 918 to the checkout application 502 with a custom URL and the checkout token as a parameter. In the checkout application 502, the customer 900 authenticates 920 himself/herself with the checkout server 600. Once authenticated, the customer 900 confirms the transaction with the checkout server 600, and the checkout application 502 calls 922 the checkout server 600 or website API 602 to complete the transaction identified by the checkout token. The checkout server 600 forwards 924 the transaction to a payment processor 926, which may include generating and forwarding the transaction/payment data including a dynamic cryptogram to the payment processor 926. The payment processor 926 returns 928 the transaction results to the checkout application 502, via the checkout server 600, illustrated as 930. When the transaction/payment data includes the cryptogram, the payment processor 926 may interpret the cryptogram to complete the transaction.

The cryptogram may be generated using the checkout token, primary account number (PAN), expiration or expiry date (EXP), timestamp, and/or counter, at the time of the transaction. The resulting cryptogram generated at the time of the transaction can be based on a number of methods depending on the level of security required or desired, and be in a proper format recognizable by the payment processor 926. The cryptogram can be generated locally at the mobile device, or it can be generated from a secure server and delivered to the mobile application for use via the server. The MST is able to transmit different track data payloads with different cryptograms each in the proper magnetic card format recognizable by point of sale terminals. The PAN (whether static or dynamic/token) along with expiry date (which can be used as a token mode indicator to the card issuers' TSP) and the one time use cryptogram (can be used in the CVV2 field) can also be used for remote purchases via existing website or in-app checkout that require the field.

After completion of the transaction, the checkout application 502 redirects 932 back to the originating shopping application with the checkout token and transaction results as parameters, which display a result page 934. The application obtains or receives the transaction results by one or more possible paths, including: (A) the shopping application receives the transaction results from the redirection URL parameters; the shopping application updates 936 the transaction status with the merchant server where (B) the checkout server 600 pushes 938 the results to the merchant server or (C) the merchant server pulls 940 the latest transaction status or results from the checkout server 600 through the APIs 602.

In an exemplary use case, a sports gear shopping application developed by Acme Corp. may redirect to the checkout application 502 for payment. Additional exemplary use cases may include: a grocery store BuyMore application developed by BuyMore.com may implement its own loyalty program in its own application while redirecting to the checkout application 502 for payment; similarly, a pizza ordering application by Contoso Restaurant may build a mobile application for delivery service and use the checkout application 502 for payment. In this way, the application developers (such as from different companies) can focus on the product browser and shopping experience and leave the payment part to the checkout application 502.

Figure 10:
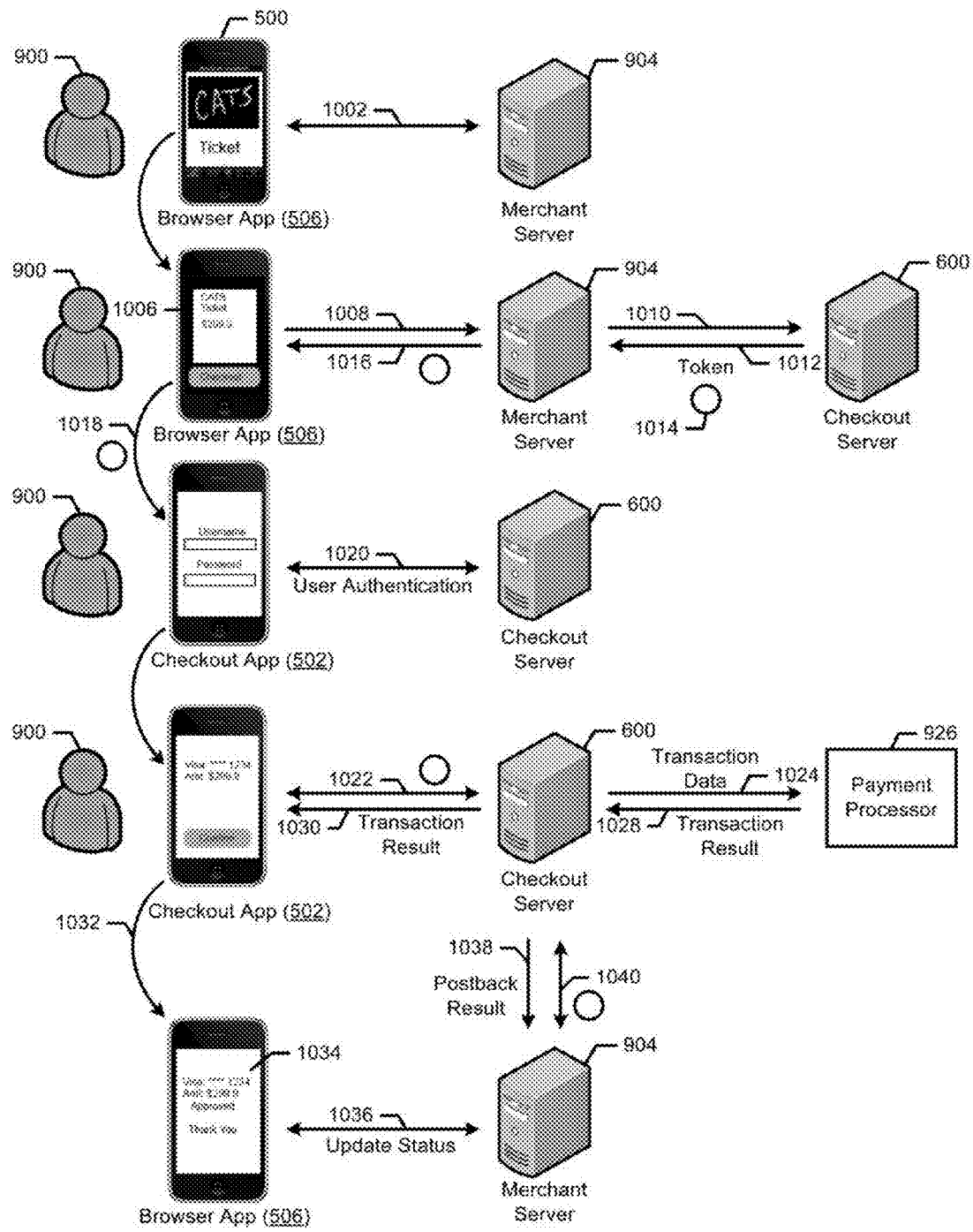
FIG. 10 is a flow diagram of a method of is a flow diagram of a method of performing a mobile checkout process using an online shopping website and a browser application.

In an aspect, FIG. 10 illustrates an exemplary operation flow of online ticketing using an online shopping website and a browser application. In this example, the user or customer 900 is browsing on an online shopping merchant website using a browser application 506 on the user's mobile communication device 500. The customer 900 launches the merchant's website, such as an opera ticket website, using the browser application 506. The customer 900 uses the browser application 506 to browse and add items to a shopping cart for checkout and purchase. In this example, the merchant website communicates 1002 with the merchant server 904 to obtain updated information of the products, such as, the opera show title, show time, and price. The merchant server 904 renders the merchant website and manages the shopping cart. When the customer 900 decides to buy a product, the customer selects the product and proceeds to a checkout step 1006. In the checkout step, the customer 900 selects 1008 the checkout button to purchase the product. The merchant website calls directly or uses the merchant server 904 to call 1010 the checkout server 600, and passes the information about the product, transaction amount, etc. The merchant server receives 1012 a checkout token 1014 from the checkout server 600.

The application 506 receives 1016 the checkout token 1014 and the merchant website redirects 1018 to the checkout application 502 with a custom URL and the checkout token as a parameter. In the checkout application 502, the customer 900 authenticates 1020 himself/herself with the checkout server 600. Once authenticated, the customer 900 confirms the transaction with the checkout server 600, and the checkout application 502 calls 1022 the checkout server 600 or website API 602 to complete the transaction identified by the checkout token. The checkout server 600 forwards 1024 the transaction to a payment processor 926, which may include generating and forwarding the transaction/payment data including a dynamic cryptogram to the payment processor 926. The payment processor 926 returns 1028 the transaction results to the checkout application 502 via the checkout server 600, illustrated as 1030. When the transaction/payment data includes the cryptogram, the payment processor 926 may interpret the cryptogram to complete the transaction.

After completion of the transaction, the checkout application 502 redirects 1032 back to the browser application 506 with the checkout token and transaction results as parameters, which displays a result page 1034. The merchant website obtains or receives the transaction results by one or more possible paths, including: (A) the merchant website receives the transaction results from the redirection URL parameters; the merchant website updates 1036 the transaction status with the merchant server where (B) the checkout server 600 pushes 1038 the results to the merchant server or (C) the merchant server pulls 1040 the latest transaction status or results from the checkout server 600 through the APIs 602.

Figure 11:
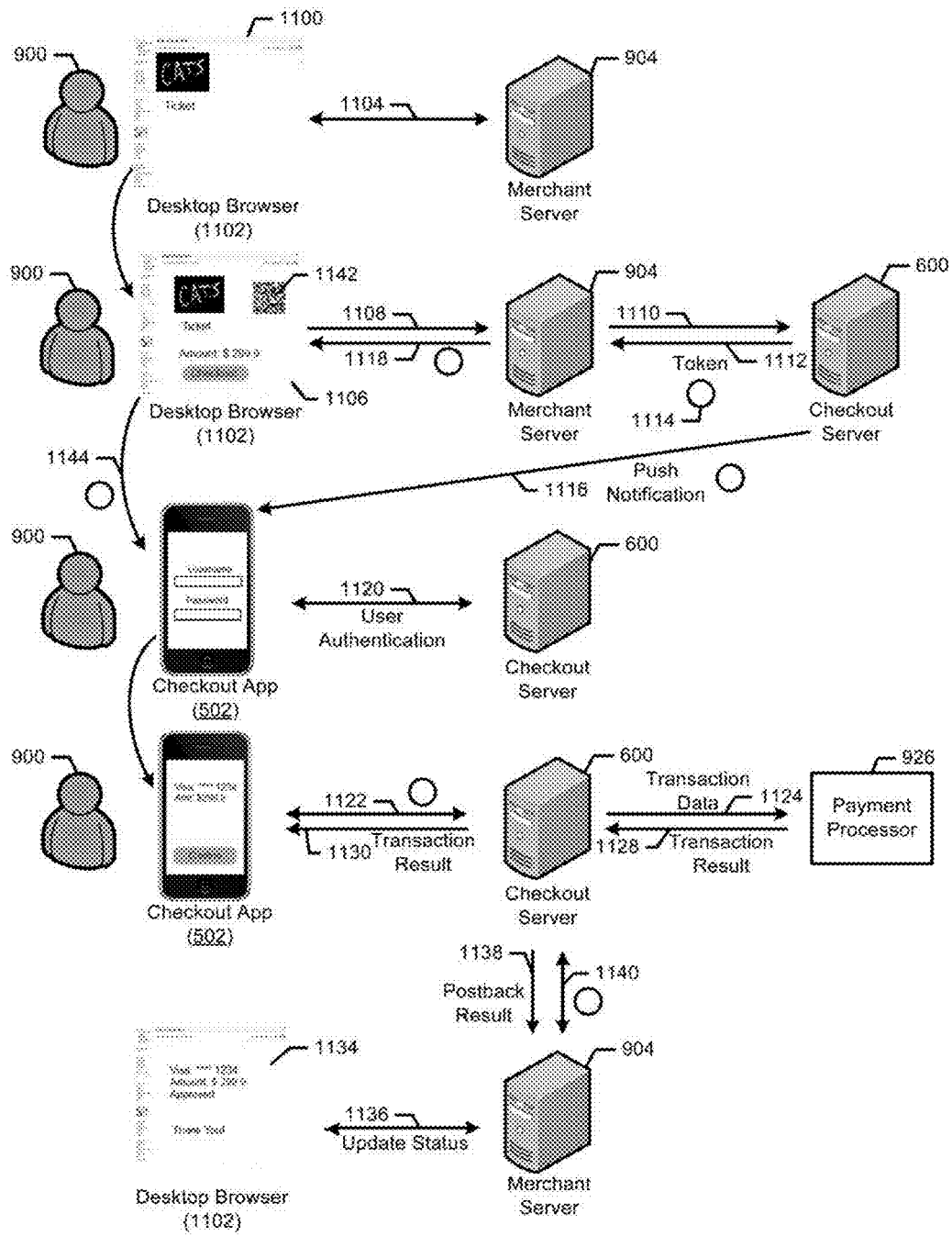
FIG. 11 is a flow diagram of a method of is a flow diagram of a method of performing a mobile checkout process by launching a checkout application using a push notification, short message service (SMS), or quick response (QR) code.

In an aspect, FIG. 11 illustrates an exemplary operation flow of launching the checkout application from a shopping webpage in a desktop browser running on a computer by push notification or short message service (SMS). In this example, the user or customer 900 is browsing on an online shopping merchant website using a desktop browser 1102 on a computing device 1100, such as a computer. The customer 900 launches the merchant's website, such as an opera ticket website, using the browser 1102. The customer 900 uses the browser to browse and add items to a shopping cart for checkout and purchase. In this example, the merchant website communicates 1104 with the merchant server 904 to obtain updated information of the products, such as, the opera show title, show time, and price. The merchant server 904 renders the merchant website and manages the shopping cart. When the customer 900 decides to buy a product, the customer selects the product and proceeds to a checkout step 1106. In the checkout step, the customer 900 selects 1108 the checkout button to purchase the product. The merchant website calls directly or uses the merchant server 904 to call 1110 the checkout server 600, and passes the information about the product, transaction amount, URLs, etc. The merchant server receives 1112 a checkout token 1114 from the checkout server 600.

The user may be prompted for the credentials to authenticate the user on the web browser. The merchant website calls the checkout server 600 to authenticate the user. After user authentication, the checkout server may look up the user's mobile communication device 500 phone number or device identifier and send 1116 a push notification or SMS to the user's registered mobile communication device 500 with the checkout token. Upon receiving the notification, the checkout application 502 is launched. In the checkout application 502, the customer 900 authenticates 1120 himself/herself with the checkout server 600. Once authenticated, the customer 900 confirms the transaction with the checkout server 600, and the checkout application 502 calls 1122 the checkout server 600 or website API 602 to complete the transaction identified by the checkout token. The checkout server 600 forwards 1124 the transaction to a payment processor 926, which may include generating and forwarding the transaction/payment data including a dynamic cryptogram to the payment processor 926. The payment processor 926 returns 1128 the transaction results to the checkout application 502 via the checkout server 600, illustrated as 1130. When the transaction/payment data includes the cryptogram, the payment processor 926 may interpret the cryptogram to complete the transaction.

The merchant website updates 1136 the transaction status, for example, by polling, and the desktop browser displays a result page 1134. The merchant website obtains or receives the transaction results by two possible paths: (A) the checkout server 600 pushes 1138 the results to the merchant server or (B) the merchant server pulls 1140 the latest transaction status or results from the checkout server 600 through the APIs 602.

In an aspect, FIG. 11 also illustrates an exemplary operation flow of launching the checkout application from a shopping webpage in a desktop browser running on a computer by QR code scanning. In this example, the user or customer 900 is browsing on an online shopping merchant website using a desktop browser 1102 on a computing device 1100, such as a computer. The customer 900 launches the merchant's website, such as an opera ticket website, using the browser 1102. The customer 900 uses the browser to browse and add items to a shopping cart for checkout and purchase. In this example, the merchant website communicates 1104 with the merchant server 904 to obtain updated information of the products, such as, the opera show title, show time, and price. The merchant server 904 renders the merchant website and manages the shopping cart. When the customer 900 decides to buy a product, the customer selects the product and proceeds to a checkout step 1106. In the checkout step, the customer 900 selects 1108 the checkout button to purchase the product. The merchant website calls directly or uses the merchant server 904 to call 1110 the checkout server 600, and passes the information about the product, transaction amount, URLs, etc. The merchant server receives 1112 a checkout token 1114 from the checkout server 600.

In this example, the merchant website or merchant server calls 1118 the checkout server 600 through the APIs 602 to obtain a QR code 1142 representation of the checkout token. The user launches the checkout application 502 on the mobile communication device 500 and scans 1144 the QR code 1142. Once the checkout application 502 is launched, the process proceeds as described above with reference to FIG. 11.

Although the methods and algorithms described above including those with reference to the foregoing flow charts and FIGS. have been described separately, it should be understood that any two or more of the methods disclosed herein can be combined in any combination. Any of the methods, algorithms, implementations, or procedures described herein can include machine-readable instructions for execution by: (A) a processor, (B) a controller, and/or (C) any other suitable processing device. Any algorithm, software, or method disclosed herein can be embodied in software stored on a non-transitory tangible medium such as, for example, a flash memory, a CD-ROM, a floppy disk, a hard drive, a digital versatile disk DVD, or other memory devices, but persons of ordinary skill in the art should readily appreciate that the entire algorithm and/or parts thereof could alternatively be executed by a device other than a controller and/or embodied in firmware or dedicated hardware in a well known manner e.g., it may be implemented by an application specific integrated circuit (ASIC), a programmable logic device (PLD), a field programmable logic device (FPLD), discrete logic, etc. Further, although specific methods and algorithms are described with reference to flowcharts depicted herein, persons of ordinary skill in the art should readily appreciate that many other methods of implementing the example machine readable instructions may alternatively be used. For example, the order of execution of the steps may be changed, and/or some of the steps described may be changed, eliminated, or combined.

It should be noted that the methods and algorithms illustrated and discussed herein may have various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

The mobile communication device may be a laptop computer, a cellular phone, a personal digital assistant (PDA), a tablet computer, and other mobile devices of the type. Communications between components and/or devices in the systems and methods disclosed herein may be unidirectional or bidirectional electronic communication through a wired or wireless configuration or network. For example, one component or device may be wired or networked wirelessly directly or indirectly, through a third party intermediary, over the Internet, or otherwise with another component or device to enable communication between the components or devices. Examples of wireless communications include, but are not limited to, radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, 4G network, and other communication networks of the type.

Although the devices, systems, and methods have been described and illustrated in connection with certain embodiments, many variations and modifications will be evident to those skilled in the art and may be made without departing from the spirit and scope of the disclosure. The discourse is thus not to be limited to the precise details of methodology or construction set forth above as such variations and modification are intended to be included within the scope of the disclosure.

What is claimed is:

1. A checkout system implemented on a mobile communication device including a merchant application or browser application available on the mobile communication device and adapted to allow a user to select items to purchase from a merchant, comprising:
   a communication processor in communication with a checkout server hosting one or more web service checkout application program interfaces (APIs) adapted to communicate with the mobile communication device; and
   a checkout application installed on the mobile communication device and adapted:
   to be launched in response to receiving information corresponding to a purchase transaction;
   to receive user payment information, including magnetic stripe data, from a magnetic stripe transporter (MST) embedded in or in communication with the mobile communication device, wherein a cryptogram is generated at the time of the purchase transaction and included in the magnetic stripe data to secure the magnetic stripe data; and
   to communicate with the checkout server and cause the checkout server to complete the purchase transaction using the magnetic stripe data from the magnetic stripe transporter.

2. The checkout system of claim 1, wherein the checkout server creates a checkout token identifying the purchase transaction in response to the user initiating the purchase transaction.

3. The checkout system of claim 2, wherein the checkout server sends the checkout token to the merchant application or browser application.

4. The checkout system of claim 3, wherein the checkout application receives the checkout token from the merchant application or browser application.

5. The checkout system of claim 4, wherein the checkout application authenticates the user.

6. The checkout system of claim 5, wherein the checkout application confirms the purchase transaction with the checkout server in response to the user authentication.

7. The checkout system of claim 6, wherein the checkout application sends the checkout token and results of the purchase transaction to the merchant application or browser application during relaunch of the merchant application or browser application.

8. The checkout system of claim 7, wherein the merchant application or browser application displays a results page corresponding to the purchase transaction in response to being relaunched.

9. The checkout system of claim 1, wherein the checkout server completes the purchase transaction by communicating the transaction, including the magnetic stripe data including the cryptogram, to a payment processor.

10. The checkout system of claim 1, wherein the checkout application is adapted to be launched in response to receiving the information corresponding to the purchase transaction from the merchant application or browser application.

11. The checkout system of claim 1, wherein the checkout application is adapted to be launched in response to receiving the information corresponding to the purchase transaction from the checkout server.

12. The checkout system of claim 1, wherein the checkout application is adapted to be launched in response to receiving the information corresponding to the purchase transaction from the checkout server through a push notification, email, or short message service.

13. The checkout system of claim 1, wherein the checkout application is adapted to be launched in response to receiving the information corresponding to the purchase transaction from a quick response (QR) code scanned by the mobile communication device.

14. A method, comprising:
    allowing a user to browse and select items for purchase from a merchant through a first application or browser;
    launching a checkout application installed on a mobile communication device in response to the checkout application receiving information corresponding to a purchase transaction;
    receiving, by the checkout application, a checkout token identifying the purchase transaction created by a checkout server;
    receiving, by the checkout application, user payment information, including magnetic stripe data, from a magnetic stripe transporter (MST) embedded in, or in communication with the mobile communication device, wherein a cryptogram is at the time of the purchase transaction and included in the magnetic stripe data to secure the magnetic stripe data; and
    communicating, by the checkout application, with the checkout server to cause the checkout server to complete the purchase transaction using secured magnetic stripe data from the magnetic stripe transporter; and
    relaunching the first application or browser in response to completion of the transaction.

15. The method of claim 14, wherein the receiving of the checkout token includes receiving the checkout token from the first application or browser application.

16. The method of claim 14, further comprising authenticating, by the checkout application, the user prior to the communicating with the checkout server.

17. The method of claim 14, wherein the launching of the checkout application includes launching the checkout application in response to receiving the information corresponding to the purchase transaction from the checkout server through a push notification, email, or short message service.

18. The method of claim 14, wherein the launching of the checkout application includes launching the checkout application in response to receiving the information corresponding to the purchase transaction from user scanning a quick response (QR) code.

* * * * *